M. BUCKLIN.
Harrow.
No. {1,458, 32,462.}
Patented June 4, 1861.
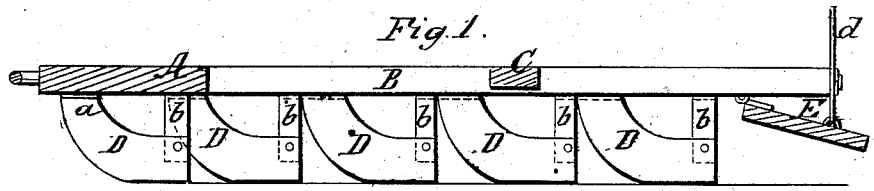
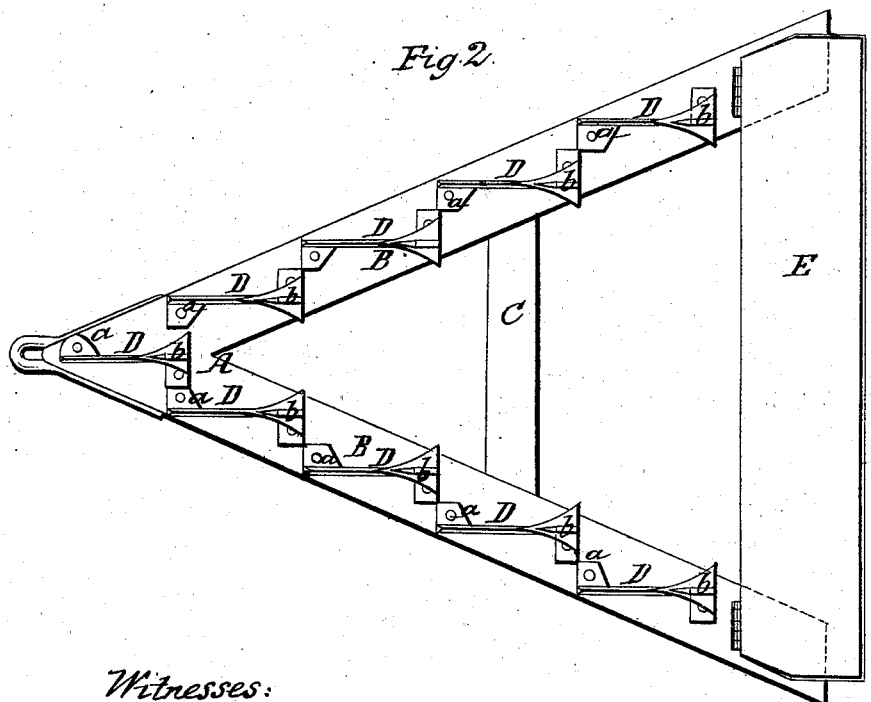
Witnesses:
R. S. Spencer.
R. S. Campbell.
Inventor:
Moses Bucklin.

UNITED STATES PATENT OFFICE.

MOSES BUCKLIN, OF GRAFTON, NEW HAMPSHIRE.

IMPROVEMENT IN HARROWS.

Specification forming part of Letters Patent No. 32,462, dated June 4, 1861.

*To all whom it may concern:*

Be it known that I, MOSES BUCKLIN, of Grafton, in the county of Grafton and State of New Hampshire, have invented a new and Improved Harrow; and I do hereby declare that the following is a full, clear, and exact description of the same, reference being had to the accompanying drawings, forming a part of this specification, in which—

Figure 1 represents a longitudinal vertical section of my invention. Fig. 2 is an inverted plan of the same.

Similar letters of reference in both views indicate corresponding parts.

To enable those skilled in the art to make and use my invention, I will proceed to describe it.

A represents the harrow-frame, which consists of two diverging side bars, B, which are united by a cross-bar, C, the whole being constructed much like frames for other similar implements.

Secured to the under side of the side bars, B, and as close together as may be desirable, are the cultivator-teeth D, the cutting-edge of which is inclined and rounded off, as clearly represented in Fig. 1, so that the teeth pass more readily over stones, stumps, roots, or other obstructions. Their rear ends are split open and the wings are turned out both ways, as clearly shown in Fig. 2, forming semi-mold-boards on each side of the cutting-edge, and being constructed on the whole much like those teeth for which a patent was granted to me on the 2d day of February, 1858. The chief difference between the teeth which I now employ and those described in the above-mentioned Letters Patent consists in the method of fastening them to the frame, so that I am enabled to use steel for my teeth without increasing the cost or the labor. Instead of having two flanges cast to the sides of the teeth, I now use only one flange, $a$, formed by bending over the upper end of the teeth, the rear end of the same being steadied by means of a stud, $b$, which extends down between the two wings, and which may or may not be fastened to the same by a rivet. With full-sized machines no extra fastening will be required, as the studs may be driven in beween the wings so firmly that the teeth are kept perfectly steady, and as the strain on the the teeth is all in the direction against the studs, it will have a tendency to secure the same still tighter between the wings. By employing this method of fastening the teeth I am enabled to forge them quite readily out of steel, it having been found indispensable, more particularly for new ground, to have steel teeth, and the labor to fasten the teeth to the frame is not any greater than with other similar teeth, both the flanges $a$ and the studs $b$ being attached to the side bars by means of screws, as clearly represented in Fig. 2.

Attached to the rear end of the side bars, B, is the tail-board E, its inner edge being hinged to the under side of the bars, so that it swings up and down, as will be clearly understood by referring to Fig. 1. The rear end of this tail-board is suspended from the ends of the side bars by means of bars $d$, which are slotted so that they can be fastened in different positions, thereby adjusting the height of the tail-board from the ground.

By employing a series of double-winged teeth arranged one behind the other on the diverging side bars, the ground is broken much more effectually then it is done with other similar harrows—such, for instance, as described in the Letters Patent of D. W. Shares dated January 27, 1857, where the teeth have only one wing turned inward. With my teeth each particle of ground is subjected to the successive action of all the teeth. The track is opened by the front tooth, and the ground is thrown over toward both sides by the action of its wings. The next succeeding teeth are so arranged that the ground thrown over by the wings of the first tooth is again acted on by the inner wings of the second teeth, which, by means of their outer wings, turn over a new portion of ground for the action of the inner wings of the next succeeding teeth, and so on until the ground is broken and perfectly mollified to the full width of the tail-board, which latter prevents the harrow from cutting any deeper than is required, and which at the same time serves to smooth down and level the ground, leaving the field in such a fine state as with other implements can be effected only with the utmost care and with much more labor.

Having thus fully described my invention, what I claim as new, and desire to secure by Letters Patent, is—

The arrangement of the diverging side bars, B B, provided with double-winged teeth, in connection with the tail-board E and bars $d$, the whole being constructed, arranged, and used as and for the purpose specified.

MOSES BUCKLIN.

Witnesses:
R. S. SPENCER,
J. W. COOMBS.